(12) United States Patent
Subramanian

(10) Patent No.: US 6,906,375 B2
(45) Date of Patent: Jun. 14, 2005

(54) DIVALENT EUROPIUM-CONTAINING COMPOSITIONS

(75) Inventor: Munirpallam Appadorai Subramanian, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/716,353

(22) Filed: Nov. 18, 2003

(65) Prior Publication Data

US 2004/0196619 A1 Oct. 7, 2004

Related U.S. Application Data

(60) Provisional application No. 60/427,407, filed on Nov. 19, 2002.

(51) Int. Cl.[7] .......................... C04B 35/465; H01G 4/06
(52) U.S. Cl. .................... 257/310; 501/134; 501/136
(58) Field of Search ................... 257/310; 361/311; 501/134, 136

(56) References Cited

U.S. PATENT DOCUMENTS

| 4,309,295 A | * | 1/1982 | McSweeney ......... 252/62.3 BT |
| 4,545,929 A | * | 10/1985 | Masuyama et al. .... 252/520.21 |

FOREIGN PATENT DOCUMENTS

| JP | 63256519 | 10/1988 |
| JP | 2528117 | 6/1996 |

OTHER PUBLICATIONS

Patent Abstracts of Japan, Feb. 13, 1989, vol. 013, No. 063.
Das, B.P., et al., "Effect of Europium on Structural, Dielectric and Electrical Properties of Pb(SnTi) O3 ferroelectric ceramics", Materials Science and Engineering B, Elsevier Sequota, Lausanne, Nov. 15, 2003, pp. 96–105, CH, vol. 104, No. 1–2.

* cited by examiner

*Primary Examiner*—Minhloan Tran
*Assistant Examiner*—Thomas L. Dickey

(57) ABSTRACT

This invention provides compositions of the formula $EuCu_3M_4O_{12}$ wherein M is Ge, Ti, Sn or mixtures thereof. These compositions have high dielectric constant and low loss over a frequency range of from 1 kHz to 1 MHz.

20 Claims, 1 Drawing Sheet

DIVALENT EUROPIUM-CONTAINING COMPOSITIONS

This application claims the benefit of U.S. Provisional Application No. 60/427,407, filed Nov. 19, 2002, which is incorporated in its entirety as a part hereof for all purposes.

FIELD OF THE INVENTION

This invention relates to compositions of the formula $EuCu_3M_4O_{12}$ wherein M is selected from the group consisting of Ge, Ti, and Sn, and mixtures thereof.

BACKGROUND OF THE INVENTION

The use of dielectric materials to increase capacitance is well known and long-used. In the past, capacitor dielectrics have fallen into two categories. Dielectrics in the first category have a relatively temperature-independent dielectric constant but the value of the dielectric constant is low, e.g., 5–10. Materials such as electrical porcelain and mica fall in this category. Dielectrics in the second category have a high dielectric constant, e.g., 1000 or more, but they are quite frequency dependent. An example is barium titanate, $BaTiO_3$.

Since capacitance is proportional to dielectric constant, high dielectric constant materials are desired. In order to perform acceptably in electronic circuits, a dielectric must have a dielectric constant that exhibits minimal frequency dependence. It is also desirable that the loss or dissipation factor of a dielectric be as small as possible.

Japanese Patent 2,528,117 B2 discloses superconducting materials of the formula $(M^1)_x (M^2)_y (M^3)_z O_w$, wherein $M^1$ is B, Al, Ga, In, Tl, Sc, Y, La, Ce, Pr, Nd, Pm, Sm, Eu, Gd, Tb, Dy, Ho, Er, Tm, Yb, or Lu;

$M^2$ is BE, Mg, CA, Sr, Ba, Ra, Sn or Pb;

M3 is Cu; and x, y, z and w represents the molar ratio of the corresponding constituent elements.

It has been found, however, that other Europium-containing compositions function well as dielectrics.

SUMMARY OF THE INVENTION

This invention provides compositions of the formula $EuCu_3M_4O_{12}$ wherein M is selected from the group consisting of Ge, Ti, and Sn, and mixtures thereof. The compositions have high dielectric constant and low loss over a frequency range of from 1 kHz to 1 MHz, and are especially useful as a capacitor in electronic devices such as phase shifters, matching networks, oscillators, filters, resonators, and antennas comprising interdigital and trilayer capacitors, coplanar waveguides and microstrips. The invention also includes a capacitor made from such a composition, an electronic device made from such a capacitor, and the use of such a composition to make a capacitor.

DETAILED DESCRIPTION

Figure 1:
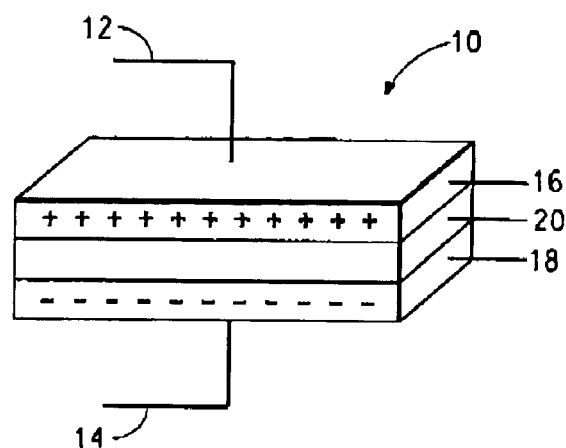
FIG. 1 shows a capacitor.

The compositions of this invention may be described as $EuCu_3M_4O_{12}$ wherein M is selected from the group consisting of Ge, Ti, and Sn, and mixtures thereof. These compositions have dielectric properties that provide advantages in electronic devices requiring a high dielectric constant with minimal frequency dependence and low loss.

The compositions of this invention can be synthesized by the following procedure. Appropriate amounts of the starting oxides EuO, CuO and $TiO_2$ or $SnO_2$ or $GeO_2$ are weighed according to the stoichiometric ratios and mixed thoroughly in an agate mortar. The gram amounts of the starting materials used in representative examples are shown in Table 1. The mixed powder of starting materials is calcined at about 700° C. for about 12 hours in an argon atmosphere. The powder is reground and loaded in a gold capsule and heated at about 1000° C. for about 1 hour under about 60 kbar pressure in a tetrahedral anvil press. In both the steps, the rate at which the temperature ramps up is about 200° C./hour from room temperature, and the cooling rate is about 150° C./hour from the reaction temperature to room temperature, i.e., about 20° C.

The compositions of this invention are single phase materials, and crystallize in a cubic perovskite-related Im3 structure.

Dielectric measurements can be carried out on disk samples of the compositions of this invention. The faces of a disk-shaped sample are polished with a fine-grit sand or emery paper. Silver paint electrodes are applied on the faces and dried at about 70–100° C. Capacitance and dielectric loss measurements can be performed by the two-terminal method using Hewlett-Packard 4275A and 4284A LCR bridges at a temperature of about 25° C. over a frequency range of from about 1 kHz to about 1 MHz. The capacitance (C) and the dissipation factor are read directly from the bridge. The dielectric constant (K) is calculated from the measured capacitance (C) in picofarads from the following relationship:

K=(100 C t)/(8.854 A), where t is thickness of the disk shaped sample in cm and A is the area of the electrode in $cm^2$.

The advantageous effects of this invention are demonstrated by a series of examples, as described below. The embodiments of the invention on which the examples are based are illustrative only, and do not limit the scope of the invention.

Examples 1–3. The compositions $EuCu_3M_4O_{12}$, wherein M is Ge, Ti and/or Sn, are made by using the following procedure. For each example, appropriate amounts of the starting oxides EuO, CuO and $TiO_2$ or $SnO_2$ or $GeO_2$ are weighed according to the stoichiometric ratios and mixed thoroughly in an agate mortar. The gram amounts of the starting materials used are shown in Table 1.

TABLE 1

| Ex. | Composition | | CuO | EuO |
|---|---|---|---|---|
| 1 | $EuCu_3Ge_4O_{12}$ | 1.5214 ($GeO_2$) | 0.8678 | 0.6108 |
| 3 | $EuCu_3Ti_4O_{12}$ | 1.3201 ($TiO_2$) | 0.9859 | 0.6940 |
| 4 | $EuCu_3Sn_4O_{12}$ | 1.7916 ($SnO_2$) | 0.7092 | 0.4992 |

The mixed powder of starting materials is calcined at about 700° C. for about 12 hours in argon atmosphere. The powder is reground and loaded in a gold capsule and heated at about 1000° C. for about 1 hour under about 60 kbar pressure in a tetrahedral anvil press. In both the steps, the rate at which the temperature ramps up is about 200° C./hour from room temperature, and the cooling rate is about 150° C./hour from the reaction temperature to room temperature, i.e., about 20° C.

X-ray powder diffraction patterns were recorded with a Siemens D5000 diffractometer. The data showed all samples crystallized in a cubic perovskite-related Im3 structure. The measured lattice parameters are listed in Table 2.

TABLE 2

| Ex. | Composition | Lattice Parameter (nm) |
|---|---|---|
| 1 | $EuCu_3Ge_4O_{12}$ | 0.7221 (1) |
| 2 | $EuCu_3Ti_4O_{12}$ | 0.7429 (1) |
| 3 | $EuCu_3Sn_4O_{12}$ | 0.7612 (1) |

The disk shaped samples (3 mm diameter and 2 mm thick) are polished to produce flat uniform surfaces and electroded with silver paint. The painted samples are dried at about 70–100° C. overnight. Capacitance and loss tangent measurements are made at room temperature using a HP-4284A LCR meter over a frequency range of from about 1 kHz to about 1 MHz. The dielectric constants are high and the loss factors are low. Variations of dielectric constant (K) and loss factor (Tan δ) over a range of frequency from about $10^3$ Hz to about $10^6$ Hz, measured at about 25° C. for the samples of Examples 1–3, are shown in Table 3. The dielectric constants and loss factors have minimal frequency dependence over 3 orders of magnitude change in frequency.

TABLE 3

| | | $10^3$ Hz | | $10^4$ Hz | | $10^5$ Hz | | $10^6$ Hz | |
|---|---|---|---|---|---|---|---|---|---|
| Ex. | Composition | K | Tan δ | K | Tan δ | K | Tan δ | K | Tan δ |
| 1 | $EuCu_3Ge_4O_{12}$ | 112 | 0.032 | 104 | 0.028 | 99 | 0.035 | 95 | 0.032 |
| 2 | $EuCu_3Ti_4O_{12}$ | 1340 | 0.095 | 1326 | 0.074 | 1293 | 0.065 | 1084 | 0.071 |
| 3 | $EuCu_3Sn_4O_{12}$ | 465 | 0.081 | 454 | 0.079 | 439 | 0.067 | 433 | 0.063 |

Figure 2:
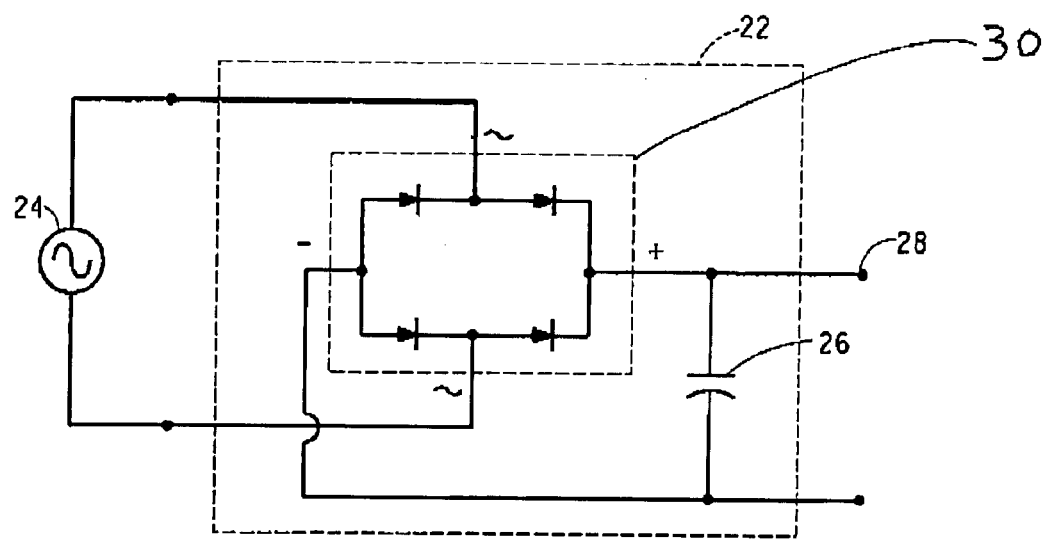
FIG. 2 shows an AC-DC rectifier with a capacitor filter circuit.

A capacitor may Include a composition of this invention as the dielectric. A typical capacitor, which is a passive electronic component that stores energy in the form of an electrostatic field, is shown in FIG. 1. FIG. 1 shows a capacitor 10, electrical input lines 12, 14 (such as from a battery, not shown) running to the capacitor 10, and two electrodes 16 and 18 separated by a dielectric 20. An electronic device may be made from a capacitor tat includes a composition of this Invention as the dielectric. A typical-example of su 6 h an electronic device is an AC-DC rectifier with a capacitor filter circuit in which the capacitor filters the ripple voltage. FIG. 2 shows such a device 22, which has AC input lines 24, a rectifier 30, a capacitor 26, and DC output lines 28.

What is claimed is:

1. A composition of the formula $EuCu_3M_4O_{12}$ wherein M is selected from the group of Ge, Ti, Sn and mixtures thereof.

2. A composition according to claim 1 wherein M is Ge.

3. A composition according to claim 1 wherein M is Ti.

4. A composition according to claim 1 wherein M is Sn.

5. A composition according to claim 1 wherein M is a mixture of Ge, Ti and Sn.

6. A capacitor comprising a dielectric material wherein said dielectric material is comprised of a composition of the formula $EuCu_3MO_{12}$ wherein M is selected from the group of Ge, Ti, Sn and mixtures thereof.

7. A capacitor according to claim 6 wherein M is Ge.

8. A capacitor according to claim 6 wherein M is Ti.

9. A capacitor according to claim 6 wherein M is Sn.

10. A capacitor according to claim 6 wherein M is a mixture of Ge, Ti and Sn.

11. An electronic device comprising a capacitor with a dielectric material, wherein said dielectric material is comprised of a composition of the formula $EuCu_3M_4O_{12}$ wherein M is selected from the group of Ge, Ti, Sn and mixtures thereof.

12. An electronic device according to claim 11 wherein M is Ge.

13. An electronic device according to claim 11 wherein M is Ti.

14. An electronic device according to claim 11 wherein M is Sn.

15. An electronic device according to claim 11 wherein M is a mixture of Ge, Ti and Sn.

16. A process for making a capacitor comprising (a) providing a dielectric material wherein said dielectric material is comprised of a composition of the formula $EuCu_3M_4O_{12}$ wherein M is selected from the group of Ge, Ti, Sn and mixtures thereof; and (b) making a capacitor from the dielectric material.

17. A process according to claim 16 wherein M is Ge.

18. A process according to claim 16 wherein M is Ti.

19. A process according to claim 16 wherein M is Sn.

20. A process according to claim 16 wherein M is a mixture of Ge, Ti and Sn.

* * * * *